US009777746B2

(12) United States Patent
Maier

(10) Patent No.: US 9,777,746 B2
(45) Date of Patent: Oct. 3, 2017

(54) MOTOR COOLING SYSTEM MANIFOLD

(71) Applicant: William C. Maier, Almond, NY (US)

(72) Inventor: William C. Maier, Almond, NY (US)

(73) Assignee: Dresser-Rand Company, Olean, NY (US)

( * ) Notice: Subject to any disclaimer, the term of this patent is extended or adjusted under 35 U.S.C. 154(b) by 178 days.

(21) Appl. No.: 14/456,089

(22) Filed: Aug. 11, 2014

(65) Prior Publication Data

US 2015/0064026 A1   Mar. 5, 2015

Related U.S. Application Data

(60) Provisional application No. 61/873,004, filed on Sep. 3, 2013.

(51) Int. Cl.
| | | |
|---|---|---|
| *F04B 39/02* | (2006.01) | |
| *F04D 29/58* | (2006.01) | |
| *F04D 17/12* | (2006.01) | |
| *F04D 25/06* | (2006.01) | |
| *H02K 7/14* | (2006.01) | |
| *H02K 9/19* | (2006.01) | |

(52) U.S. Cl.
CPC ....... *F04D 29/5806* (2013.01); *F04D 17/122* (2013.01); *F04D 25/0606* (2013.01); *F04D 25/0686* (2013.01); *F04D 29/584* (2013.01); *H02K 7/14* (2013.01); *H02K 9/19* (2013.01)

(58) Field of Classification Search
CPC ............... F04D 29/5805; F04D 29/584; F04D 25/0686; F04D 25/0606; F04D 17/122; H02K 7/14; H02K 9/19

USPC .............. 417/423.6, 368; 310/63; 415/208.3, 415/211.1
See application file for complete search history.

(56) References Cited

U.S. PATENT DOCUMENTS

| | | | | |
|---|---|---|---|---|
| 1,594,058 A | * | 7/1926 | Freiburghouse | ......... H02K 1/32 |
| | | | | 310/58 |
| 2,556,435 A | * | 6/1951 | Moehrl | ................. F04D 29/061 |
| | | | | 310/157 |
| 2,596,646 A | | 5/1952 | Alfred | |

(Continued)

FOREIGN PATENT DOCUMENTS

EP       1731070 A1    12/2006

OTHER PUBLICATIONS

PCT/US2014/051048—International Search Report and Written Opinion of he International Searching Authority, dated Nov. 10, 2014, 10 pages.

(Continued)

*Primary Examiner* — Charles Freay

(57) ABSTRACT

A cooling system for a motor-compressor and a method for cooling the motor-compressor are provided. The cooling system may include a discharge assembly having a hub portion disposed radially outward of a rotary shaft of the motor-compressor. A plurality of arms may be fluidly coupled with and may extend generally tangential from the hub portion of the discharge assembly. The hub portion may define an annular volume fluidly coupled with the plurality of arms. The cooling system may also include a blower impeller disposed in the annular volume and coupled with the rotary shaft. The blower impeller may be configured to rotate with the rotary shaft and draw a cooling fluid into the discharge assembly.

11 Claims, 6 Drawing Sheets

(56) References Cited

U.S. PATENT DOCUMENTS

| | | | | |
|---|---|---|---|---|
| 2,687,695 | A * | 8/1954 | Blom | F04D 13/0613 310/54 |
| 3,073,976 | A * | 1/1963 | Wesolowski | H02K 9/06 310/227 |
| 3,302,583 | A * | 2/1967 | Hunt | F04D 13/0653 310/63 |
| 3,711,731 | A * | 1/1973 | Pluschke | H02K 9/193 310/53 |
| 3,764,236 | A * | 10/1973 | Carter | F04D 1/06 415/104 |
| 4,669,279 | A * | 6/1987 | Maeda | H02K 9/20 310/54 |
| 4,932,848 | A * | 6/1990 | Christensen | F04D 13/086 417/368 |
| 5,315,193 | A | 5/1994 | Kummer et al. | |
| 5,762,833 | A * | 6/1998 | Gross | B01F 7/1635 261/93 |
| 6,280,139 | B1 * | 8/2001 | Romani | F04D 29/441 415/207 |
| 6,943,469 | B2 * | 9/2005 | Nelson | H02K 9/06 310/52 |
| 8,097,810 | B2 | 1/2012 | Benestad et al. | |
| 8,523,540 | B2 * | 9/2013 | Eide | 310/52 |
| 8,653,704 | B2 * | 2/2014 | Atarashi | B60K 6/405 310/52 |
| 8,823,223 | B2 * | 9/2014 | Han | H02K 5/20 310/54 |
| 2002/0146320 | A1 * | 10/2002 | Moussa | F01D 5/145 415/208.3 |
| 2007/0200438 | A1 * | 8/2007 | Kaminski | F04D 1/063 310/54 |
| 2009/0317265 | A1 | 12/2009 | Skofteland et al. | |
| 2010/0232984 | A1 * | 9/2010 | Bade | F04D 13/10 417/53 |
| 2011/0271654 | A1 | 11/2011 | Siden | |
| 2011/0298314 | A1 | 12/2011 | Atarashi et al. | |
| 2012/0100017 | A1 | 4/2012 | La Boube | |
| 2012/0107143 | A1 * | 5/2012 | Gilarranz | F04D 25/0606 417/53 |
| 2013/0136629 | A1 | 5/2013 | Maier | |

OTHER PUBLICATIONS

EP 14843125.7-1607 / 3042079—Extended European Search Report, European Patent Office, dated Mar. 22, 2017, 9 pages.

* cited by examiner

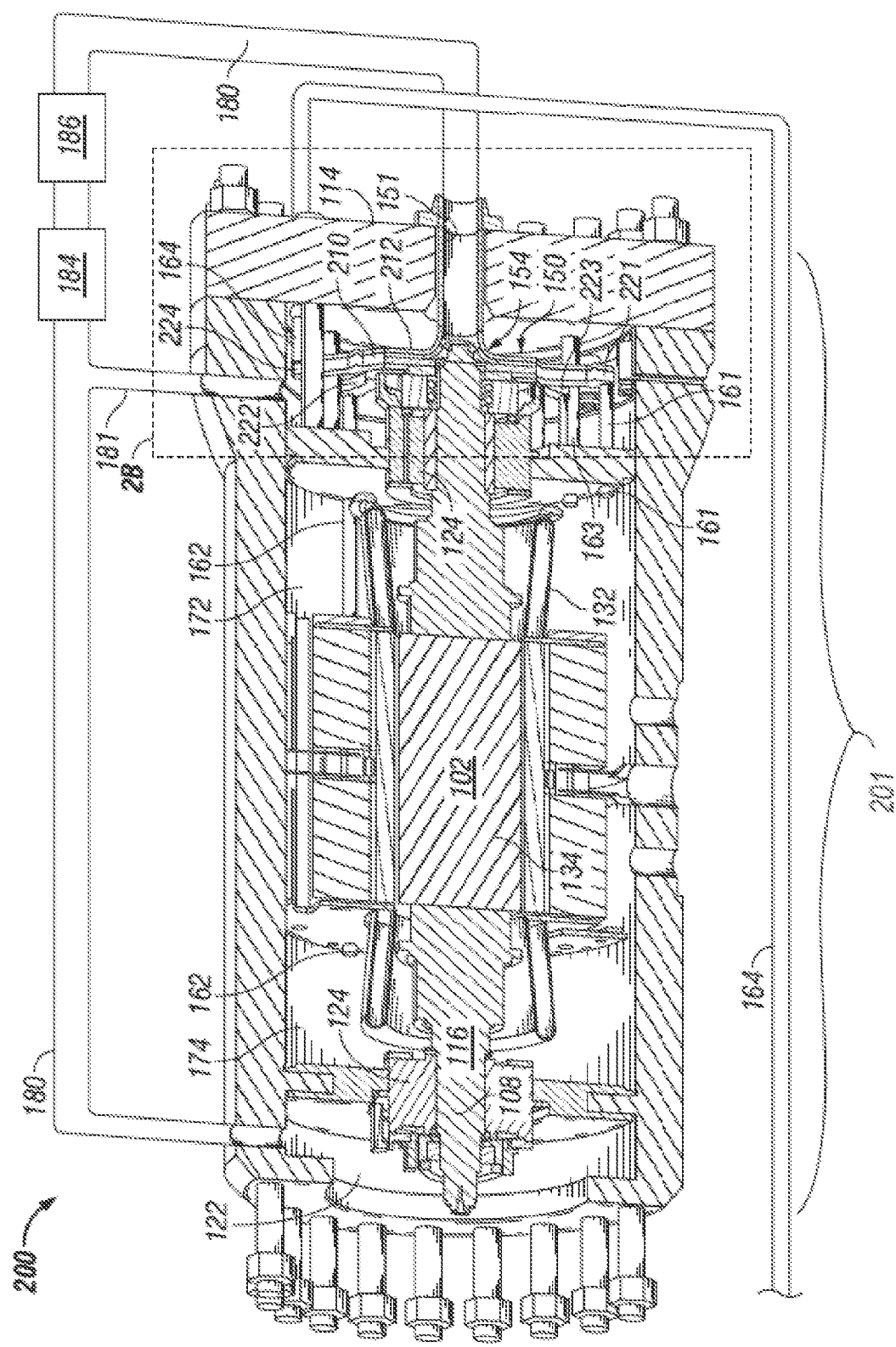

MOTOR COOLING SYSTEM MANIFOLD

CROSS-REFERENCE TO RELATED APPLICATIONS

This application claims priority to U.S. Provisional Patent Application having Ser. No. 61/873,004, which was filed Sep. 3, 2013. This priority application is hereby incorporated by reference in its entirety into the present application to the extent consistent with the present application.

BACKGROUND

Conventional compact motor-compressors that incorporate compressors directly coupled with high-speed electric motors have been developed and may often be utilized in a myriad of industrial processes (e.g., petroleum refineries, offshore oil production platforms, and subsea process control systems) to compress process fluids. The compact motor-compressors may combine the high-speed electric motors with the compressors, such as a centrifugal compressor, in a single, hermetically-sealed housing. Through shared or coupled rotary shafts supported by a bearing system, the motors may drive or rotate the compressors to thereby compress the process fluids.

As the motors drive the compressors, heat may be generated by electrical systems configured to deliver electrical energy to stators of the motors. Additional heat may also be generated through windage friction resulting from the rotating components operating in the pressurized process fluids. Improper management of the heat may reduce operational efficiencies and may ultimately result in damage to the compact motor-compressors and/or components thereof (e.g., insulation of the stators). Additionally, increased temperatures resulting from the improper management of the heat may cause the bearing system to fail, which may cause the rotary shafts supported by the bearing system to fall or drop onto adjacent mechanical surface. Static and dynamic radial and thrust forces acting on the falling rotary shafts upon failure of the bearing system may cause substantial damage to the rotary shafts and/or surrounding components.

In view of the foregoing, some conventional compact motor-compressors may often utilize external pressurization systems driven separately from the motor-compressors to manage the heat. The external pressurization systems may circulate a separate cooling fluid (e.g., air) in a cooling circuit with an external fan or blower driven independently from the motor-compressors. Failure of the external pressurization systems, however, may result in overheating and potential catastrophic failure. For example, the motor-compressors may continue to operate and generate heat upon failure of the separately driven external pressurization systems, thereby resulting in the overheating of the motor-compressors.

What is needed, then, is an improved cooling system and method for cooling the motor-compressor and/or components thereof capable of operating concurrently with the motor-compressor.

SUMMARY

Embodiments of the disclosure may provide a cooling system for a motor-compressor. The cooling system may include a discharge assembly having a hub portion disposed radially outward of a rotary shaft of the motor-compressor. A plurality of arms may be fluidly coupled with and may extend generally tangential from the hub portion of the discharge assembly. The hub portion may define an annular volume fluidly coupled with the plurality of arms. The cooling system may also include a blower impeller disposed in the annular volume and coupled with the rotary shaft. The blower impeller may be configured to rotate with the rotary shaft and draw a cooling fluid into the discharge assembly.

Embodiments of the disclosure may also provide a motor-compressor. The motor-compressor may include a housing having a motor end and a compressor end. The housing may define a plurality of internal cooling passages of the motor-compressor. A motor may be coupled with a rotary shaft and in fluid communication with at least one of the plurality of internal cooling passages of the motor-compressor. Radial bearings may be disposed proximal each end portion of the rotary shaft and may be in fluid communication with at least one of the plurality of internal cooling passages. The motor-compressor may also include a discharge assembly having a hub portion disposed radially outward of the rotary shaft. A plurality of arms may be fluidly coupled with the hub portion and may extend outward from the hub portion of the discharge assembly. The hub portion may define an annular volume fluidly coupled with the plurality of arms. A blower impeller may be disposed in the annular volume of the hub portion and coupled with the rotary shaft. The blower impeller may be configured to rotate with the rotary shaft and draw a cooling fluid into the discharge assembly.

Embodiments of the disclosure may further provide a method for cooling a motor-compressor. The method may include supporting each end portion of a rotary shaft in a housing of the motor-compressor with radial bearings. The housing of the motor-compressor may define a plurality of internal cooling passages, and at least one of the plurality of internal cooling passages may be in fluid communication with at least one of the radial bearings. The method may also include rotating the rotary shaft with a motor coupled therewith, and driving a blower impeller coupled with the rotary shaft. The method may also include directing a cooling fluid to a discharge assembly disposed radially outward of the rotary shaft. The discharge assembly may at least partially define an annular volume in a hub portion of the discharge assembly. The method may further include discharging the cooling fluid from the discharge assembly to the plurality of internal cooling passages via a plurality of arms extending outward from the hub portion of the discharge assembly to thereby cool the motor-compressor.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

FIG. 2A illustrates a cross-sectional, perspective view of a motor portion of another motor-compressor, according to one or more embodiments disclosed.

DETAILED DESCRIPTION

Figure 1:
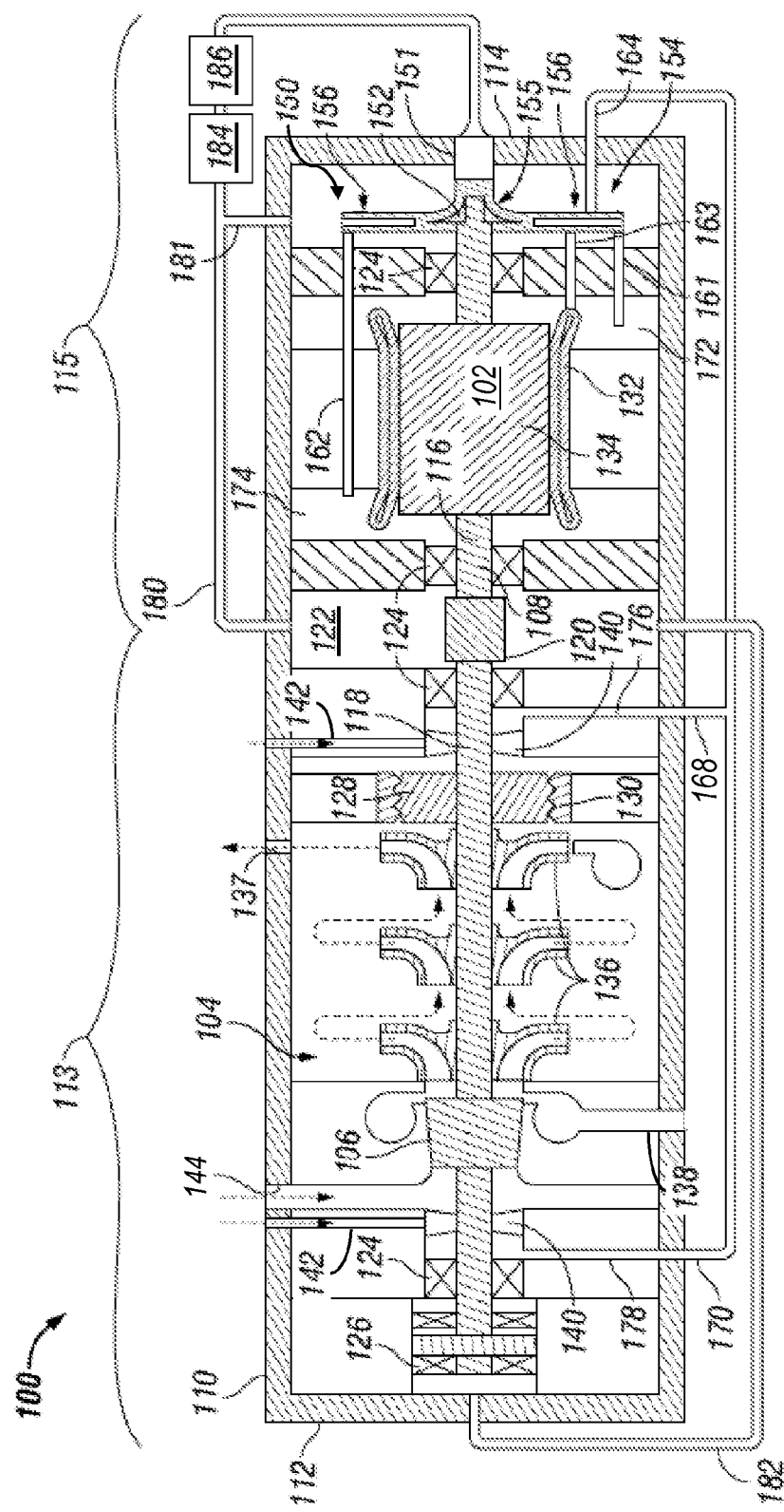
FIG. 1 illustrates a cross-sectional, schematic view of a motor-compressor, according to one or more embodiments disclosed.

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Further, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

FIG. 1 illustrates a cross-sectional, schematic view of an exemplary motor-compressor 100 having an exemplary cooling system, according to one or more embodiments. In at least one embodiment, the motor-compressor 100 may include a motor 102, a compressor 104, and an integrated separator 106 coupled with one another via a rotary shaft 108. In another embodiment, the integrated separator 106 may be omitted from the motor-compressor 100. The motor 102, the compressor 104, and/or the integrated separator 106 may each be disposed or positioned within a housing 110 having a first end, or compressor end 112, and a second end, or motor end 114. In at least one embodiment, the housing 110 may include a compressor portion 113 and a motor portion 115 configured to hermetically seal the motor 102, the compressor 104, and/or the integrated separator 106. For example, the motor 102 may be disposed in the motor portion 115 of the housing 110, and the compressor 104 may be disposed in the compressor portion 113 of the housing 110.

The rotary shaft 108 may include a motor section 116 and a driven section 118, and may extend substantially from the compressor end 112 to the motor end 114 of the housing 110. The motor section 116 of the rotary shaft 108 may be coupled with or otherwise driven by the motor 102. The driven section 118 of the rotary shaft 108 may be coupled with the compressor 104 and/or the integrated separator 106. The motor section 116 and the driven section 118 may be coupled with one another via a coupling 120, such as a flexible or a rigid coupling. The coupling 120 may be disposed within a cavity 122 defined within the housing 110. Accordingly, the motor 102 may rotate the motor section 116, which may rotate the driven section 118 coupled therewith via the coupling 120.

In at least one embodiment, the integrated separator 106 may be configured to separate and/or remove high-density components (e.g., liquids and/or solids) from low-density components (e.g., liquids and/or gases) contained within a process fluid introduced thereto. For example, the process fluid may be introduced to the integrated separator 106 via an inlet 144 of the motor-compressor 100, and the integrated separator 106 may remove the high-density components contained therein. The high-density components removed from the process fluid may be discharged from the integrated separator 106 via a discharge line 138 to thereby provide a relatively dry process fluid that may be introduced to the compressor 104. In at least one embodiment, the process fluid may be a multiphase fluid and the high-density component may be a liquid. Accordingly, the integrated separator 106 may separate the liquid from the multiphase fluid and discharge the liquid via the discharge line 138. The discharged liquid from the discharge line 138 may accumulate in a collection vessel (not shown) and may be subsequently pumped or directed back into the process fluid at a pipeline location downstream of the compressor 104.

In at least one embodiment, the process fluid introduced into the motor-compressor 100 via the inlet 144 may include, but is not limited to, a hydrocarbon gas, such as natural gas or methane, which may be derived from a production field or via a pressurized pipeline. The process fluid may also include, but is not limited to, air, carbon dioxide, nitrogen, ethane, propane, or any combination thereof.

In at least one embodiment, the compressor 104 may be a multistage centrifugal compressor having one or more compressor stage impellers 136 (three are shown). It may be appreciated, however, that any number of impellers 136 may be utilized without departing from the scope of the disclosure. The compressor 104 may be configured to receive the dry process fluid from the integrated separator 106 and compress the dry process fluid through the impellers 136 to thereby provide a compressed or pressurized process fluid. The pressurized process fluid may then be directed or discharged via a process discharge 137 defined in the housing 110 of the motor-compressor 100.

In at least one embodiment, the motor 102 may be an electric motor, such as a permanent magnet motor, and may include a stator 132 and a rotor 134. It may be appreciated, however, that additional embodiments may employ other types of electric motors including, but not limited to, synchronous motors, induction motors, brushed DC motors, or the like. In at least one embodiment, the motor 102 may include a variable frequency drive configured to drive the motor 102 at varying rates or speeds.

In at least one embodiment, the motor-compressor 100 may include one or more radial bearings 124 (four radial bearings are shown) directly or indirectly supported by the housing 110 and configured to support the rotary shaft 108. For example, as illustrated in FIG. 1, the radial bearings 124 may support the motor section 116 and the driven section 118 of the rotary shaft 108 at each end portion thereof. Illustrative radial bearings 124 may include magnetic bearings, such as active or passive magnetic bearings, or the like. In at least one embodiment, one or more axial thrust bearings 126 may be coupled with the rotary shaft 108 to at least partially support and/or counteract thrust loads or forces generated by the compressor 104. For example, a pressure differential may be provided by the rise in pressure generated from the compressor 104, which may provide the compressor 104 with a net thrust or load in the direction of an inlet thereof. The axial thrust bearings 126 may be coupled with the rotary shaft 108 at or proximal the compressor end 112 of the housing 110 to at least partially support and/or counteract the net thrust from the compressor 104. In at least one embodiment, a balance piston 128 having a balance piston seal 130 may be coupled with the rotary shaft 108 between the motor 102 and the compressor 104 and configured to at least partially counteract the net thrust or load applied thereto from the compressor 104. For example, the balance piston 128 may be coupled with the rotary shaft 108 near or proximal the last impeller 136 of the compressor 104 to at least partially counteract the net thrust applied thereto.

In at least one embodiment, motor-compressor 100 may further include one or more buffer seals 140 (two are shown) configured to extend operable lifetimes of the radial bearings 124, the axial bearing 126, the motor 102, or any combination thereof. For example, the operable lifetimes of the radial bearings 124, the axial bearing 126, and/or the motor 102 may be extended by using the "clean" or dry process fluid, and the buffer seals 140 may be configured to prevent the "dirty" or multiphase process fluid from being directed or "leaked" to the radial bearings 124, the axial bearing 126, and/or the motor 102. In at least one embodiment, the buffer seals 140 may be radial seals disposed or positioned at or near the end portions of the driven section 118 of the rotary shaft 108. For example, as illustrated in FIG. 1, the buffer seals 140 may be disposed inboard of the radial bearings 124 at the end portions of the driven section 118 of the rotary shaft 108. The buffer seals 140 may be dry gas seals and/or carbon ring seals and may be configured to receive a flow of a pressurized seal gas via lines 142. In addition to, or in substitution of the carbon ring seals, the buffer seals 140 may also be or include brush seals or labyrinth seals.

In at least one embodiment, the pressurized seal gas directed to the buffer seals 140 via lines 142 may be the pressurized process fluid from the compressor 104. For example, the pressurized process fluid discharged from the compressor 104 via the process discharge 137 may be subsequently filtered and directed to the buffer seals 140 via lines 142. The pressurized seal gas directed to the buffer seals 140 may include, but is not limited to, dry or clean hydrocarbon gases, hydrogen, inert gases, or any combination thereof. Illustrative inert gases may include, but are not limited to, helium, nitrogen, carbon dioxide, or the like. The pressurized seal gas directed to the buffer seals 140 may provide a pressure differential to prevent the process fluid (e.g., wet process fluid) from leaking across the buffer seals 140 to portions of the housing 110 where the radial bearings 124, the axial bearing 126, and/or the motor 102 may be disposed.

In exemplary operation of the motor-compressor 100, the motor 102 may rotate the rotary shaft 108 to drive the compressor 104 and the integrated separator 106 coupled therewith. The process fluid may be introduced into the motor-compressor 100 via the inlet 144 defined in the housing 110. The integrated separator 106 may receive the process fluid via the inlet 144 and separate at least a portion of the high-density components (e.g., liquid) therefrom to provide the substantially dry process fluid. The high-density components separated from the process fluid may be removed or discharged via the discharge line 138, and the remaining dry process fluid may be directed to the compressor 104. The compressor 104 may receive the dry process fluid from the integrated separator 106 and compress the dry process fluid through the impellers 136 thereof to produce the pressurized process fluid. The pressurized process fluid may then be discharged via the process discharge 137.

In at least one embodiment, the motor-compressor 100 may include a blower assembly 150 configured to regulate a temperature of the motor 102 and/or the bearings 124, 126 thereof. As further described herein, the blower assembly 150 may regulate the temperature of the motor 102 and/or the bearings 124, 126 by flowing or circulating a cooling fluid through a cooling circuit. In at least one embodiment, the blower assembly 150 may be at least partially disposed within the housing 110 of the motor-compressor 100. For example, as illustrated in FIG. 1, the blower assembly 150 may be disposed within the motor portion 115 of the housing 110. In another embodiment, the blower assembly 150 may be coupled with the motor end 114 or the compressor end 112 of the housing 110. For example, the blower assembly 150 may include a bolt-on casing or a blower casing (not shown) coupled with the motor end 114 of the housing 110. The blower casing may be bolted directly to the motor end 114 of the housing 110 via an existing bolt pattern used to hermetically-seal the motor 102 within the housing 110. In another example, the blower casing of the blower assembly 150 may be coupled or otherwise attached to the housing 110 via any other manner known in the art, including, but not limited to, welding, brazing, adhesives, riveting, or any combination thereof. In another embodiment, the blower casing of the blower assembly 150 may be integrally formed with the compressor end 112 or the motor end 114 of the housing 110.

As illustrated in FIG. 1, the blower assembly 150 may include at least one impeller, such as a blower impeller 152, coupled with the rotary shaft 108. For example, the blower impeller 152 may be coupled with an end portion of the rotary shaft 108 near or proximal the motor end 114 of the housing 110. In at least one embodiment, the blower impeller 152 may be a centrifugal impeller and may be driven or rotated by the rotary shaft 108 coupled therewith. The rotation of the blower impeller 152 (e.g., centrifugal impeller) may generate a pressure differential (e.g., head pressure) to draw the cooling fluid into the blower assembly 150 via an inlet 151 defined in the motor end 114 of the housing 110.

As previously discussed, the motor 102 may have a variable frequency drive configured to drive the motor 102 at varying speeds. As such, the pressure differential generated by the blower impeller 152 may be determined, at least in part, by the rate or speed in which the rotary shaft 108 and/or the motor 102 may be operated. In at least one embodiment, the blower impeller 152 may be sized or designed to provide the minimum differential pressure necessary to circulate the cooling fluid through the cooling circuit. For example, the blower impeller 152 may be configured to provide the minimum differential pressure when the rotary shaft 108 and/or the motor 102 may be operating at a low speed (e.g., during startup), when the rotary shaft 108 and/or the motor 102 may be ramping, and/or when the rotary shaft 108 and/or the motor 102 may be operating at full speed.

As illustrated in FIG. 1, the blower assembly 150 may include a discharge assembly 154 disposed radially outward of the rotary shaft 108. The discharge assembly 154 may include a hub portion 155 disposed radially outward of the rotary shaft 108 and one or more arms (two are shown 156) at least partially extending radially outward from the hub portion 155. In at least one embodiment, the blower impeller 152 may be at least partially disposed in the hub portion 155 and may rotate therein relative to the discharge assembly 154, which may be generally stationary. The arms 156 may be in fluid communication with the blower impeller 152 and configured to receive the cooling fluid from the blower impeller 152. The arms 156 may receive the cooling fluid from the blower impeller 152 and direct the cooling fluid to one or more distribution tubes (four are shown 161, 162, 163, 164) disposed radially outward of the blower impeller 152. For example, the arms 156 of the discharge assembly 154 may provide one or more flow passages 236 (see FIG. 2D) between the blower impeller 152 disposed in the hub portion 155 and the distribution tubes 161, 162, 163, 164.

In at least one embodiment, the distribution tubes 161, 162, 163, 164 may be configured to receive the cooling fluid from the arms 156 and direct the cooling fluid to one or more portions of the motor-compressor 100. For example, the distribution tubes 161, 162, 163, 164 may receive the cooling fluid from the arms 156 of the blower assembly 150 and direct the cooling fluid to the motor 102 and/or the bearings 124, 126 to thereby regulate the temperatures thereof. The distribution tubes 161, 162, 163, 164 may be or include a pipe or any other type of conduit capable of containing and flowing the cooling fluid therethrough. The distribution tubes 161, 162, 163, 164 may be sized to supply the cooling fluid at a sufficient pressure and/or volume to the one or more portions of the motor-compressor 100.

In at least one embodiment, one or more of the distribution tubes 161, 162, 163, 164 may be internal distribution tubes (three are shown 161, 162, 163) and may be completely disposed or contained within the housing 110 of the motor-compressor 100. For example, as illustrated in FIG. 1, the internal distribution tubes 161, 162, 163 may be completely contained within the housing 110 and may extend from the discharge assembly 154 toward the compressor end 112 of the housing 110. In at least one embodiment, the internal distribution tubes 161, 162, 163 may not be capable of extending through one or more portions of the motor-compressor 100, or the internal distribution tubes 161, 162, 163 may not provide a cost effective option for cooling one or more portions of the motor-compressor 100. For example, the internal distribution tubes 161, 162, 163 may not be capable of effectively directing the cooling fluid from the blower assembly 150 to the radial bearings 124 and/or axial bearing 126 disposed in the compressor portion 113 of the housing 110. Accordingly, one or more of the distribution tubes 161, 162, 163, 164 may be external distribution tubes (one is shown 164) having at least a portion thereof disposed external to the housing 110. The external distribution tube 164 may extend from the discharge assembly 154 to and through the motor end 114 of the housing 110, and may further extend along the exterior of the housing 110 to thereby provide the cooling fluid to the radial bearings 124 and/or the axial bearing 126 disposed in the compressor portion 113 of the housing 110.

As previously discussed, the blower assembly 150 may circulate the cooling fluid throughout the motor-compressor 100 via the cooling circuit to regulate the temperature of the motor 102, the radial bearings 124, and/or the axial bearing 126. In at least one embodiment, the cooling circuit may include, but is not limited to, the blower assembly 150 and/or components thereof. For example, as illustrated in FIG. 1, the cooling circuit may include the discharge assembly 154, the arms 156, the blower impeller 152, the distribution tubes 161, 162, 163, 164, or any combination thereof. In at least one embodiment, the cooling circuit may also include the cavity 122 defined within the housing 110 and/or one or more internal cooling passages 172, 174, 176, 178 defined and/or formed in the housing 110.

In at least one embodiment, the distribution tubes 161, 162, 163, 164 may be configured to receive the cooling fluid from the discharge assembly 154 and direct the cooling fluid to the internal cooling passages 172, 174, 176, 178 to cool the motor-compressor 100 and/or components thereof. For example, the internal distribution tubes 161, 162 may be fluidly coupled with the internal cooling passages 172, 174, respectively, and configured to direct the cooling fluid thereto. The cooling fluid directed to the internal cooling passages 172, 174 may flow through one or more portions of the motor 102 to cool one or more components thereof. For example, the cooling fluid in the internal cooling passages 172, 174 may flow to the stator 132 of the motor 102 to remove at least a portion of the heat generated by the motor 102. The distribution tubes 161, 162, 163, 164 may also be directly coupled with one or more components of the motor-compressor 100. For example, as illustrated in FIG. 1, the internal distribution tube 163 may be fluidly coupled with the stator 132 of the motor 102 and configured to direct the cooling fluid thereto. The cooling fluid directed to the internal cooling passages 172, 174 may flow through the radial bearings 124 supporting the motor section 116 of the rotary shaft 108 to thereby remove at least a portion of heat generated by the radial bearings 124. For example, the cooling fluid in the internal cooling passages 172, 174 may flow through a gap defined between each of the radial bearings 124 and the motor section 116 of the rotary shaft 108 to remove the heat generated by the radial bearings 124.

As illustrated in FIG. 1, the cooling fluid in the internal cooling passage 174 on a first side of the motor 102 (i.e., the left side as illustrated in FIG. 1) may flow from the internal cooling passage 174 to the cavity 122 via the radial bearings 124. The heated or spent cooling fluid in the cavity 122 may be discharged from the cavity 122 via a return line 180 fluidly coupled therewith. The return line 180 may fluidly couple the cavity 122 with the inlet 151 of the blower assembly 150 and may be configured to direct or cycle the cooling fluid from the cavity 122 to the blower assembly 150. As further illustrated in FIG. 1, the cooling fluid in the internal cooling passage 172 on a second side of the motor 102 (i.e., the right side as illustrated in FIG. 1) may flow through the radial bearings 124 and combine with the cooling fluid in the return line 180 via line 181. It should be noted that the terms "left" and "right," or other directions and orientations described herein, are provided for clarity in reference to the Figures and are not intended to be limiting of the actual system or use thereof.

In at least one embodiment, the external distribution tube 164 may be fluidly coupled with the internal cooling passages 176, 178, and configured to direct the cooling fluid thereto to cool the respective radial bearings 124 supporting the driven section 118 of the rotary shaft 108. For example, as illustrated in FIG. 1, the external distribution tube 164 may be separated or split into separate lines 168, 170 fluidly coupled with the internal cooling passages 176, 178, respectively. As the cooling fluid nears the radial bearings 124 supporting the driven section 118, the buffer seals 140 may prevent the cooling fluid from flowing to portions of the housing 110 where the compressor 104 and/or the integrated separator 106 may be disposed. Instead, the cooling fluid may flow through the radial bearings 124 supporting the driven section 118, and may be subsequently cycled or directed back to the blower assembly 150. For example, the cooling fluid in the internal cooling passage 178 may flow through the radial bearing 124 disposed near or adjacent the compressor end 112 of the housing 110 and may subsequently be discharged from the housing 110 to the cavity 122 via line 182. The cooling fluid in the internal cooling passage 178 may also flow through the axial thrust bearings 126 prior to being discharged from the housing 110 to the cavity 122 via line 182. The cooling fluid flowing through the internal cooling passage 176 may be directed to the cavity 122 via the radial bearings 124. Accordingly, the spent cooling fluid from the internal cooling passages 176, 178 may combined with one another in the cavity 122, and may further combine with the spent cooling fluid from the internal cooling passage 174. As previously discussed, the cooling fluid in the cavity 122 may be discharged from the housing 110 via the return line 180 and subsequently directed or cycled to the inlet 151 of the blower assembly 150 fluidly coupled therewith.

In at least one embodiment, a heat exchanger 184 may be fluidly coupled with the return line 180 upstream of the inlet 151 of the blower assembly 150. The heat exchanger 184 may be configured to cool or reduce the temperature of the cooling fluid (e.g., spent cooling fluid) flowing therethrough. The heat exchanger 184 may be any device capable of reducing the temperature of the cooling fluid. Illustrative heat exchangers 184 may include, but are not limited to, a direct contact heat exchanger, a trim cooler, a mechanical refrigeration unit, or any combination thereof. In at least one embodiment, the motor-compressor 100 may further include a density based separator (not shown) configured to remove any condensation generated during the cooling of the cooling fluid in the heat exchanger 184. The motor-compressor 100 may also include a fluid conditioning skid 186 fluidly coupled with the return line 180 upstream of the inlet 151 of the blower assembly 150 and configured to filter the cooling fluid flowing therethrough. It may be appreciated that cooling and/or conditioning (e.g., filtering) the cooling fluid may allow the cooling fluid to be circulated through the cooling circuit with less power from the motor 102, thereby increasing the efficiency of the motor-compressor 100.

In exemplary operation of the motor-compressor 100, the motor 102 may rotate the motor section 116 of the rotary shaft 108 and the blower impeller 152 coupled therewith to generate the pressure differential to draw the cooling fluid into the blower assembly 150 via the inlet 151. In at least one embodiment, at least a portion of the pressure differential generated by the blower impeller 152 may be provided by the compression of the cooling fluid within the arms 156 of the discharge assembly 154. The differential pressure generated via the rotation of the blower impeller 152 may circulate or flow the cooling fluid through the motor-compressor 100 via the cooling circuit. The cooling fluid circulating through the cooling circuit may absorb at least a portion of the heat or thermal energy generated by the motor-compressor 100 and/or components thereof. The spent cooling fluid may be subsequently cooled and/or treated in the heat exchanger 184 and/or the fluid conditioning skid 186, respectively, and directed back to the inlet 151 of the blower assembly 150 via the return line 180.

It may be appreciated that the motor-compressor 100 may include a control system (not shown) having one or more pressure and/or temperature sensors operably coupled with one or more components thereof and configured to monitor and/or regulate one or more operating parameters thereof. Illustrative operating parameters may include, but are not limited to, temperatures, pressures, flowrates, rotational speed of the motor 102, and the like. In at least one embodiment, the control system may be communicably and operatively coupled with the motor-compressor and/or components thereof. For example, the control system may include a programmable logic controller (PLC) with inputs from the motor-compressor 100 and/or components thereof and outputs for controlling the operating parameters. The control system may be integral with the motor-compressor 100 or the control system may be remote. The control system may also be programmable to control or change any of the varying operating parameters of the motor-compressor 100.

Figure 2B:
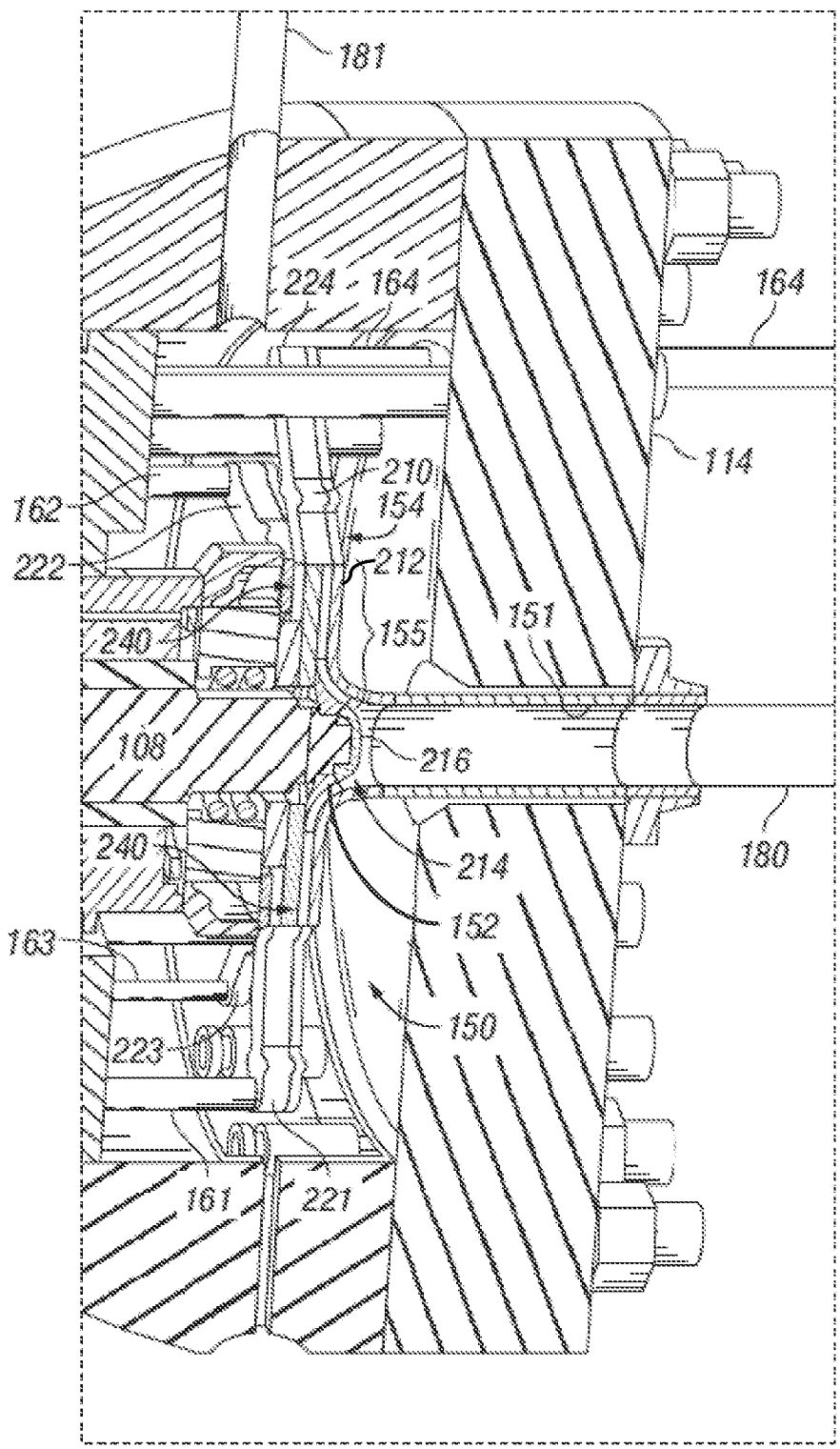
FIG. 2B illustrates an enlarged view of the portion of the motor-compressor indicated by the box labeled "2B" of FIG. 2A, according to one or more embodiments disclosed.

FIG. 2A illustrates a cross-sectional, perspective view of a motor portion 201 of another motor-compressor 200, according to one or more embodiments. FIG. 2B illustrates an enlarged view of the portion of the motor-compressor 200 indicated by the box labeled "2B" of FIG. 2A, according to one or more embodiments. The motor-compressor 200 illustrated in FIGS. 2A and 2B may be similar in some respects to the motor-compressor 100 described above and therefore may be best understood with reference to the description of FIG. 1, where like numerals designate like components and will not be described again in detail.

Figure 2C:
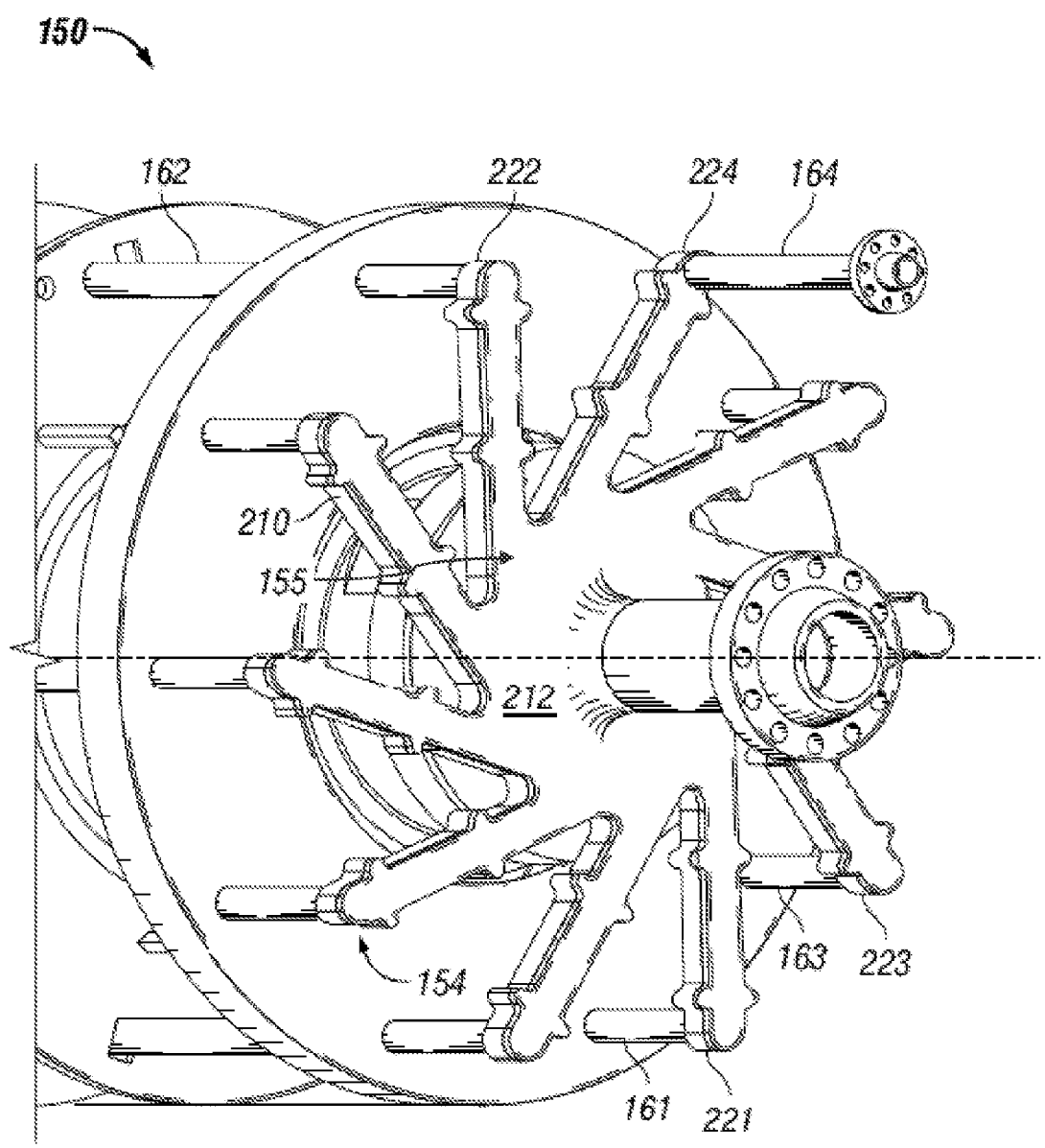
FIG. 2C illustrates a perspective view of the blower assembly of the motor-compressor of FIGS. 2A and 2B, according to one or more embodiments disclosed.

As illustrated in the cross-sectional view in FIG. 2B, and further illustrated in the perspective view in FIG. 2C, the discharge assembly 154 may include a discharge housing 210 and a cover plate 212 coupled with one another. As illustrated in FIG. 2B, the discharge housing 210 may be disposed circumferentially about and radially outward of the rotary shaft 108, and the cover plate 212 may be coupled with an axial end portion of the discharge housing 210. The discharge housing 210 and the cover plate 212 may at least partially define an annular volume 214 in the hub portion 155 of the discharge assembly 154. The blower impeller 152 may be coupled with the end portion of the rotary shaft 108, and may be at least partially disposed in the annular volume 214 between the discharge housing 210 and the cover plate 212. In at least one embodiment, the blower impeller 152 may include an impeller eye 216 axially aligned and coupled with the rotary shaft 108. The inlet 151 defined by the motor end 114 of the housing 110 may be in fluid communication with the annular volume 214 of the discharge assembly 154 and the blower impeller 152 disposed therein.

In at least one embodiment, one or more seals or seal systems (not shown) may be disposed between axial interfacing surfaces of the blower impeller 152 and the discharge housing 210 to prevent or reduce the cooling fluid from flowing therebetween. The seals or seal systems may also be disposed between axial interfacing surfaces of the blower impeller 152 and the cover plate 212 to prevent or reduce the cooling fluid from flowing therebetween. Accordingly, the cooling fluid directed to the annular volume 214 from the inlet 151 may be prevented from flowing around the blower impeller 152, and may instead be directed to and through the blower impeller 152.

As illustrated in FIGS. 2A and 2B, the discharge assembly 154 may include one or more arms (four are shown 221, 222, 223, 224). The arms 221, 222, 223, 224 may extend outward from the hub portion 155 of the discharge assembly 154 to the distribution tubes 161, 162, 163, 164. The arms 221, 222, 223, 224 may be fluidly coupled with the hub portion 155 of the discharge assembly 154 and configured to receive the cooling fluid from the annular volume 214 defined therein. The arms 221, 222, 223, 224 may receive the cooling fluid from the annular volume 214 and direct the cooling fluid to the distribution tubes 161, 162, 163, 164. For example, the arms 221, 222, 223, 224 may be fluidly coupled with the internal distribution tubes 161, 162, 163, and the external distribution tube 164, respectively, and configured to direct the cooling fluid thereto. As previously discussed, the internal distribution tubes 161, 162 may be fluidly coupled with the internal passages 172, 174, respectively, and configured to direct the cooling fluid to the internal cooling passages 172, 174 and configured to direct the cooling fluid thereto. Further, as previously discussed with reference to FIG. 1, the external distribution tube 164 may be fluidly coupled with the internal cooling passages 176, 178 and configured to direct the cooling fluid to the internal cooling passages 176, 178 to cool the respective radial bearings 124 that support the driven section 118 of the rotary shaft 108. It may be appreciated that each of the arms 221, 222, 223, 224 and/or the distribution tubes 161, 162, 163, 164 disclosed herein may include similar components and parts. Consequently, discussions herein regarding a single arm 222 and/or distribution tube 162 are equally applicable to the remaining arms 221, 223, 224 and/or distribution tubes 161, 163, 164.

Figure 2D:
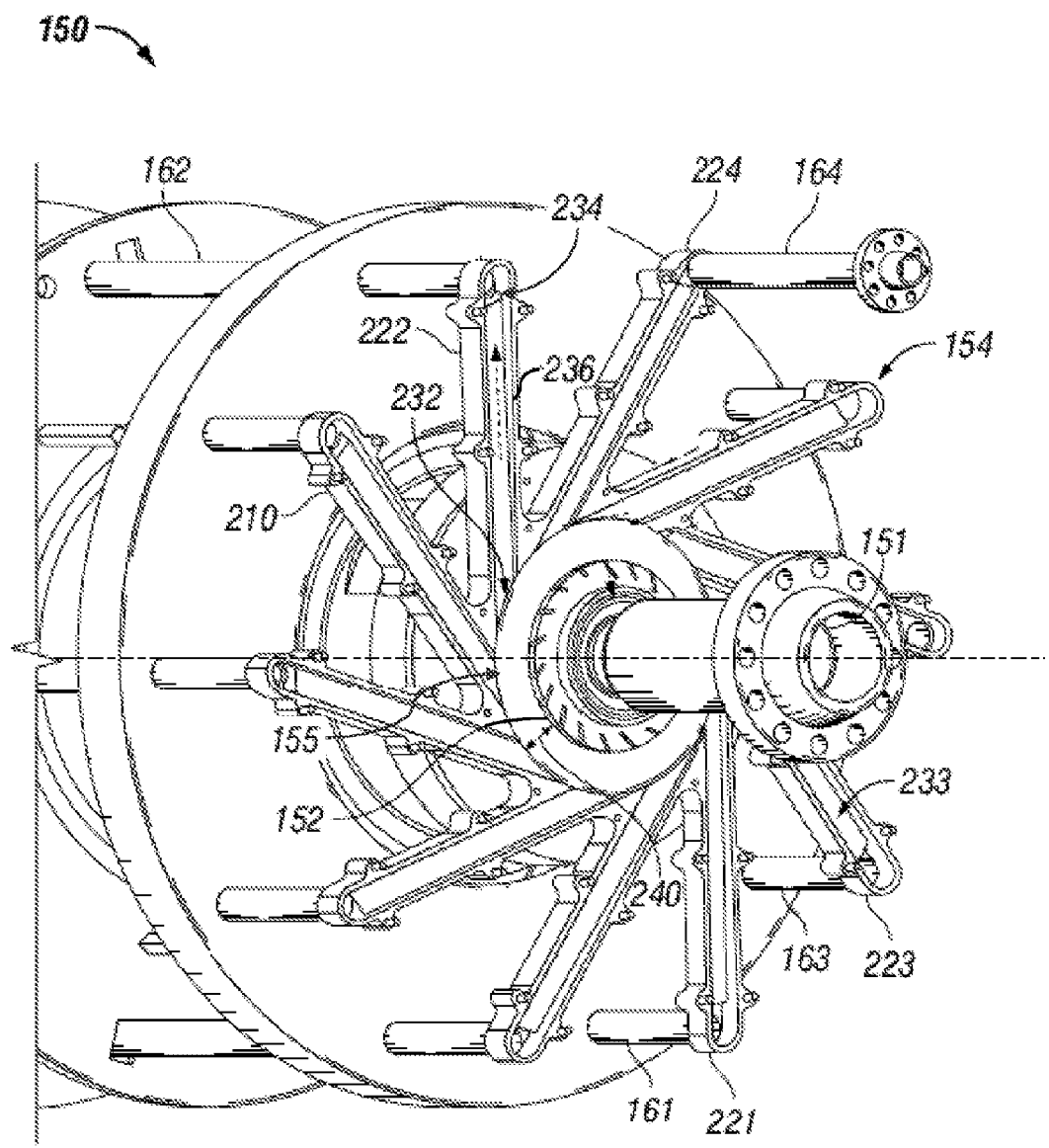
FIG. 2D illustrates a perspective view of the blower assembly of the motor-compressor of FIGS. 2A and 2B having the cover plate removed, according to one or more embodiments disclosed.

FIG. 2D illustrates a perspective view of the blower assembly 150 of the motor-compressor 200 of FIGS. 2A and 2B having the cover plate 212 removed, according to one or more embodiments. As illustrated in FIG. 2D, the hub portion 155 of the discharge assembly 154 may include a diffuser portion 240 disposed between the blower impeller 152 and the arms 221, 222, 223, 224. The discharge housing 210 and the cover plate 212 may at least partially define the diffuser portion 240. The diffuser portion 240 may be a vaneless diffuser and may be configured to convert kinetic energy (e.g., flow or velocity) of the cooling fluid from the blower impeller 152 to potential energy (e.g., pressure) by reducing the flow thereof. Accordingly, the diffuser portion 240 may be configured to receive the cooling fluid from the blower impeller 152, reduce the flow of the cooling fluid from the blower impeller 152, and diffuse the flow of the cooling fluid to a higher static pressure. The diffuser portion 240 may also be configured to redirect the flow of the cooling fluid from the blower impeller 152 to the arms 221, 222, 223, 224 fluidly coupled therewith. For example, the cooling fluid directed to the arms 221, 222, 223, 224 from the diffuser portion 240 may flow in generally tangential and/or radial directions to thereby provide a swirling flow.

As illustrated in FIGS. 2C and 2D, the arms 221, 222, 223, 224 may be coupled with the hub portion 155 and may extend from the hub portion 155 toward the respective distribution tubes 161, 162, 163, 164. In at least one embodiment, the arms 221, 222, 223, 224 may extend outward from the hub portion 155. For example, the arms 221, 222, 223, 224 may extend generally tangential from the hub portion 155. As further illustrated in FIGS. 2C and 2D, the arms 221, 222, 223, 224 may be uniformly arranged about the hub portion 155 in an annular array. The uniform arrangement of the arms 221, 222, 223, 224 may allow uniform distribution of the cooling fluid from the diffuser portion 240 and/or the blower impeller 152 to the distribution tubes 161, 162, 163, 164.

As illustrated in FIG. 2D, the arm 222 may have an inlet 232 fluidly coupled with the hub portion 155 and an outlet 234 fluidly coupled with the distribution tube 162. As further illustrated in FIG. 2D, the arm 222 may include a flow passage 236 extending between the inlet 232 and the outlet 234. The cooling fluid from the diffuser portion 240 and/or the blower impeller 152 may be directed to the distribution tube 162 via the flow passage 236 extending between the inlet 232 and the outlet 234. In at least one embodiment, the arm 222 may further diffuse the flow of the cooling fluid from the diffuser portion 240. For example, the arm 222 may receive the cooling fluid from the diffuser portion 240 and further convert kinetic energy (e.g., flow or velocity) of the cooling fluid to potential energy (e.g., pressure) by further reducing the flow thereof. The inlet 232 and the outlet 234 of the arm 222 may be circumferentially offset from one another such that the arm 222 may be angled or have an angular orientation. For example, the inlet 232 of the arm 222 may be circumferentially offset from the outlet 234 of the arm 222 such that the arm 222 may extend generally tangential from the hub portion 155 to the distribution tube 162. In at least one embodiment, at least a portion of the arm 222 may be arcuate or curved. For example, at least a portion of the arm 222 may be curved between the inlet 232 and the outlet 234 thereof.

In exemplary operation of the motor-compressor 200, with continued reference to FIGS. 1 and 2A-2D, the motor 102 may rotate the motor section 116 of the rotary shaft 108 and the blower impeller 152 coupled therewith. The blower impeller 152 disposed in the hub portion 155 of the discharge assembly 154 may rotate therein relative to the discharge housing 210 and the cover plate 212 of the discharge assembly 154, all of which may be generally stationary. The rotation of the blower impeller 152 may generate the pressure differential to draw or direct the cooling fluid to the inlet 151 of the blower assembly 150 and the blower impeller 152 disposed therein. The pressure differential may further circulate the cooling fluid through the cooling circuit. The cooling fluid directed to the blower impeller 152 may be subsequently directed to the diffuser portion 240 defined in the hub portion 155 of the discharge assembly 154 between the blower impeller 152 and the arms 221, 222, 223, 224.

The diffuser portion 240 may receive the cooling fluid from the blower impeller 152 and may at least partially convert the kinetic energy of the cooling fluid to potential energy by reducing the flow and increasing the pressure thereof. The diffuser portion 240 may also redirect the flow of the cooling fluid from the blower impeller 152 to the arms 221, 222, 223, 224. For example, the cooling fluid from the blower impeller 152 may flow in the radially outward direction toward the diffuser portion 240, and the diffuser portion 240 may redirect the flow of the cooling fluid in the generally tangential and generally radial directions (e.g., swirling flow). In at least one embodiment, the angular and/or generally tangential orientation the arms 221, 222, 223, 224 may be substantially aligned with the flow direction (e.g., swirling flow) of the cooling fluid from the diffuser portion 240. Accordingly, the cooling fluid from the diffuser portion 240 may be directed to the arms 221, 222, 223, 224 without substantially redirecting or changing the flow direction of the cooling fluid, thereby reducing or preventing pressure losses in the cooling fluid directed to the arms 221, 222, 223, 224. The arms 221, 222, 223, 224 may receive the cooling fluid from the diffuser portion 240 and direct the cooling fluid to the distribution tubes 161, 162, 163, 164 fluidly coupled therewith. The distribution tubes 161, 162, 163, 164 may receive the cooling fluid from the arms 221, 222, 223, 224 and direct the cooling fluid to one or more portions of the motor-compressor 200.

Figure 3:
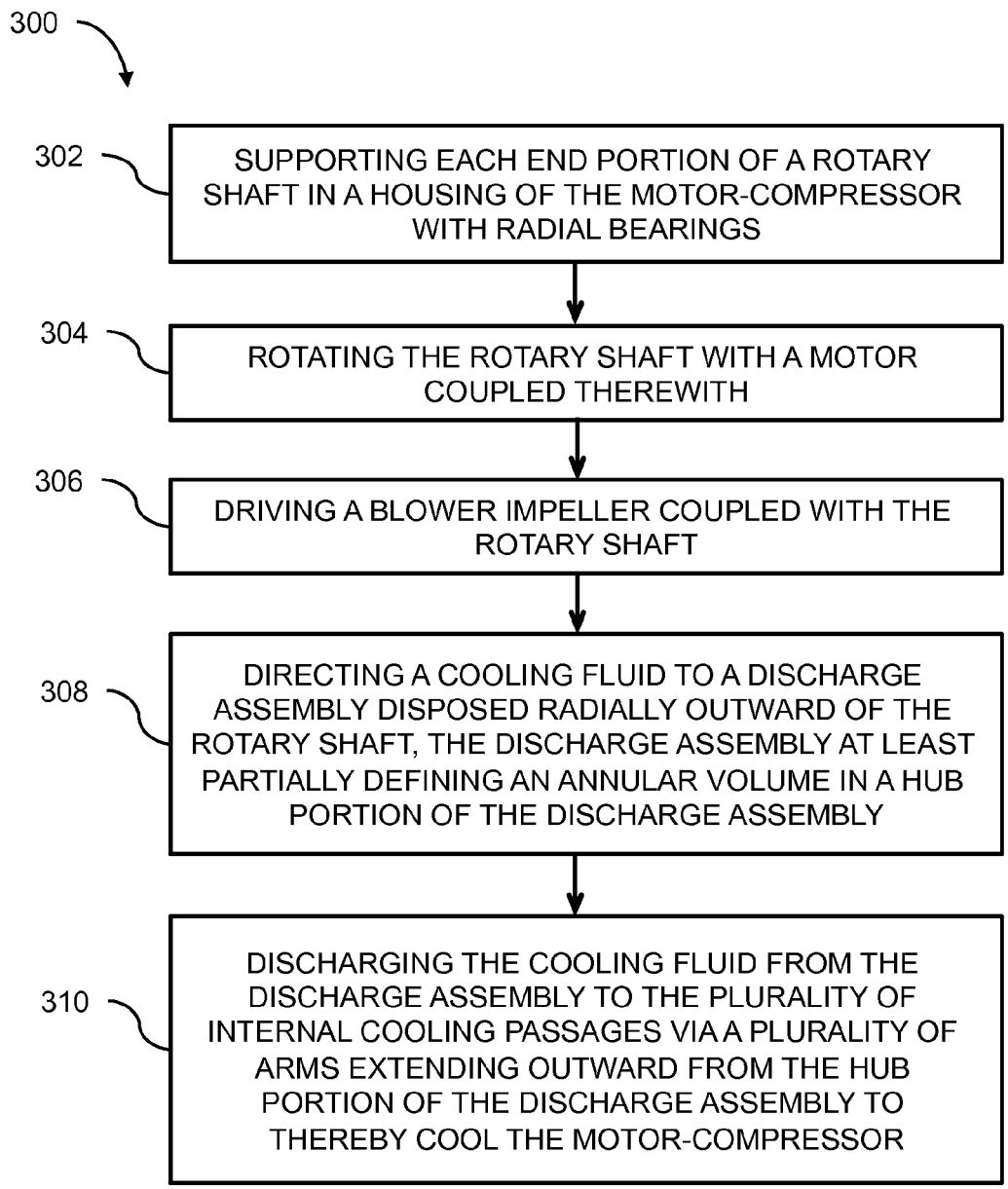
FIG. 3 is a flowchart of a method for cooling a motor-compressor, according to one or more embodiments disclosed.

FIG. 3 illustrates a flowchart of a method 300 for cooling a motor-compressor, according to one or more embodiments. The method 300 may include supporting each end portion of a rotary shaft in a housing of the motor-compressor with radial bearings, as shown at 302. The method 300 may also include rotating the rotary shaft with a motor coupled therewith, as shown at 304. The method 300 may further include driving a blower impeller coupled with the rotary shaft, as shown at 306. The method 300 may further include directing a cooling fluid to a discharge assembly disposed radially outward of the rotary shaft, the discharge assembly at least partially defining an annular volume in a hub portion of the discharge assembly, as shown at 308. The method 300 may also include discharging the cooling fluid from the discharge assembly to the plurality of internal cooling passages via a plurality of arms extending outward from the hub portion of the discharge assembly to thereby cool the motor-compressor, as shown at 310.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

I claim:

1. A cooling system for a motor-compressor, comprising:
   a discharge assembly comprising a hub portion disposed radially outward of a rotary shaft of the motor-compressor and a plurality of arms fluidly coupled with and extending generally tangential from the hub portion, the hub portion defining an annular volume fluidly coupled with the plurality of arms;
   a blower impeller disposed in the annular volume and coupled with the rotary shaft, the blower impeller configured to rotate with the rotary shaft and draw a cooling fluid into the discharge assembly;
   a return line fluidly coupled with an inlet of the discharge assembly and configured to direct the cooling fluid thereto;
   a heat exchanger fluidly coupled with the return line upstream of the inlet of the discharge assembly and configured to cool the cooling fluid flowing therethrough; and
   a plurality of distribution tubes, each distribution tube fluidly coupling a respective arm of the plurality of arms with at least one internal cooling passage of the motor-compressor, and the plurality of distribution tubes comprising
      at least one internal distribution tube contained entirely in a housing of the motor-compressor, the at least one internal distribution tube extending axially from the discharge assembly to and through a portion of the housing supporting a radial bearing and toward a motor of the motor compressor, and the at least one internal distribution tube configured to direct the cooling fluid from the discharge assembly to the motor to cool the motor; and
      an external distribution tube extending axially from the discharge assembly in an opposing direction to the at least one internal distribution tube, the external distribution tube extending to and through the housing, such that at least a portion of the external distribution tube is disposed external to the housing of the motor-compressor.

2. The cooling system of claim 1, wherein the discharge assembly further comprises a diffuser portion disposed between the blower impeller and the plurality of arms, the diffuser portion configured to receive the cooling fluid from the blower impeller and direct the cooling fluid to the plurality of arms.

3. A motor-compressor, comprising:
   a housing having a motor end, and a compressor end, the housing defining a plurality of internal cooling passages;
   a motor coupled with a rotary shaft and in fluid communication with at least one of the plurality of internal cooling passages;
   radial bearings disposed proximal each end portion of the rotary shaft, the radial bearings in fluid communication with at least one of the plurality of internal cooling passages;
   a discharge assembly comprising a hub portion disposed radially outward of the rotary shaft and a plurality of arms fluidly coupled with and extending outward from the hub portion, the hub portion defining an annular volume fluidly coupled with the plurality of arms;
   a blower impeller disposed in the annular volume and coupled with the rotary shaft, the blower impeller configured to rotate with the rotary shaft and draw a cooling fluid into the discharge assembly; and
   a plurality of distribution tubes, each distribution tube fluidly coupling a respective arm of the plurality of arms with at least one internal cooling passage of the plurality of internal cooling passages, and the plurality of distribution tubes comprising
      at least one internal distribution tube contained entirely in a housing of the motor-compressor, the at least one internal distribution tube extending axially from the discharge assembly to and through a portion of the housing supporting a first radial bearing of the radial bearings and toward the motor, and the at least one internal distribution tube configured to direct the cooling fluid from the discharge assembly to the motor to cool the motor; and
      an external distribution tube extending axially from the discharge assembly in an opposing direction to the at least one internal distribution tube, the external distribution tube extending to and through the housing, such that at least a portion of the external distribution tube is disposed external to the housing of the motor-compressor.

4. The motor-compressor of claim 3, wherein the plurality of arms extend generally tangential from the hub portion of the discharge assembly.

5. The motor-compressor of claim 3, further comprising:
   a return line fluidly coupled with an inlet of the discharge assembly and configured to direct the cooling fluid thereto; and a heat exchanger fluidly coupled with the return line upstream of the inlet of the discharge assembly and configured to cool the cooling fluid flowing through the return line.

6. The motor-compressor of claim 3, wherein the discharge assembly further comprises a diffuser portion disposed between the blower impeller and the plurality of arms, the diffuser portion configured to redirect the cooling fluid from the blower impeller to the plurality of arms.

7. The motor-compressor of claim 6, wherein the diffuser portion is a vaneless diffuser.

8. A method for cooling a motor-compressor, comprising:
supporting each end portion of a rotary shaft in a housing of the motor-compressor with radial bearings, the housing defining a plurality of internal cooling passages, and at least one of the plurality of internal cooling passages being in fluid communication with at least one of the radial bearings;
rotating the rotary shaft with a motor coupled therewith;
driving a blower impeller coupled with the rotary shaft;
directing a cooling fluid to a discharge assembly disposed radially outward of the rotary shaft, the discharge assembly at least partially defining an annular volume in a hub portion of the discharge assembly;
discharging the cooling fluid from the discharge assembly to the plurality of internal cooling passages via a plurality of arms extending outward from the hub portion of the discharge assembly; and
directing the cooling fluid from the plurality of arms to the plurality of internal cooling passages via a plurality of distribution tubes to thereby cool the motor-compressor, wherein each distribution tube of the plurality of distribution tubes fluidly couples a respective arm of the plurality of arms with at least one internal cooling passage of the motor-compressor, and the plurality of distribution tubes comprises
at least one internal distribution tube contained entirely in a housing of the motor-compressor, the at least one internal distribution tube extends axially from the discharge assembly to and through a portion of the housing supporting a first radial bearing of the radial bearings and toward the motor, and the at least one internal distribution tube configured to direct the cooling fluid from the discharge assembly to the motor to cool the motor; and
an external distribution tube extending axially from the discharge assembly in an opposing direction to the at least one internal distribution tube, the external distribution tube extending to and through the housing, such that at least a portion of the external distribution tube is disposed external to the housing of the motor-compressor.

9. The method of claim 8, further comprising cooling the cooling fluid directed to the discharge assembly with a heat exchanger.

10. The method of claim 8, further comprising directing the cooling fluid from the blower impeller to the plurality of arms via a diffuser portion of the discharge assembly.

11. The method of claim 8, wherein the plurality of arms extend generally tangential from the hub portion of the discharge assembly.

* * * * *